United States Patent
Nomura et al.

(10) Patent No.: US 6,882,157 B2
(45) Date of Patent: Apr. 19, 2005

(54) METHOD AND DEVICE FOR DIAGNOSING TROUBLE WITH SENSOR FUNCTION

(75) Inventors: Shigeo Nomura, Tokyo (JP);
Tomoyuki Sakai, Tokyo (JP);
Sumitaka Ogawa, Saitama (JP);
Yoshiaki Takeuchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/048,494

(22) PCT Filed: Jun. 20, 2001

(86) PCT No.: PCT/JP01/05247

§ 371 (c)(1),
(2), (4) Date: Jun. 21, 2002

(87) PCT Pub. No.: WO02/03030

PCT Pub. Date: Jan. 10, 2002

(65) Prior Publication Data

US 2003/0132756 A1 Jul. 17, 2003

(30) Foreign Application Priority Data

Jul. 4, 2000 (JP) ....................................... 2000-202503

(51) Int. Cl.⁷ .............................................. G01R 31/28
(52) U.S. Cl. ....................................... 324/530; 324/712
(58) Field of Search ................................ 324/658, 661, 324/671, 672, 530, 712

(56) References Cited

U.S. PATENT DOCUMENTS

| | | | | |
|---|---|---|---|---|
| 4,282,780 A | * | 8/1981 | Totani et al. | 701/51 |
| 4,350,039 A | * | 9/1982 | van Dyke et al. | 73/304 C |
| 5,506,454 A | | 4/1996 | Hanzawa et al. | 307/10.1 |
| 5,898,107 A | | 4/1999 | Schenk | |
| 6,304,091 B1 | * | 10/2001 | Shahoian et al. | 324/662 |
| 6,388,453 B1 | * | 5/2002 | Greer | 324/667 |

FOREIGN PATENT DOCUMENTS

| | | |
|---|---|---|
| EP | 0 961 102 A1 | 12/1999 |
| JP | 1-155056 | 6/1989 |
| JP | 6-146968 | 5/1994 |
| JP | 6-227410 | 8/1994 |
| JP | 7-12667 | 1/1995 |
| JP | 7-181042 | 7/1995 |
| JP | 9-304427 | 11/1997 |
| JP | 10-19624 | 1/1998 |

OTHER PUBLICATIONS

Supplementary European Search Report dated Mar. 24, 2004, for application No. EP 01 94 1109.
Experiments in Microcomputer–Control System, Aug. 1992, pp. 108–135.
Hands Shake Technique Principle, 1973, GPIB IEEE448.
Control Simulation for Full Automatic Washing Machine.

\* cited by examiner

Primary Examiner—N. Le
Assistant Examiner—Walter Benson
(74) Attorney, Agent, or Firm—Westerman, Hattori, Daniels & Adrian, LLP

(57) ABSTRACT

A sensor for converting a physical quantity into an electric signal and issuing the output is driven by a drive circuit which is driven by a drive signal issued from a 1-chip microcomputer. The 1-chip microcomputer judges fault of sensor function when the sensor output signal is out of a specified output range. Further, when stopping the operation of the drive circuit, if the sensor output signal does not coincide with a specific value, the 1-chip microcomputer also judges fault of sensor function. According to the invention, in the event of a trouble of sensor function allowing the sensor output signal to settle within an output range, such trouble can be detected.

10 Claims, 7 Drawing Sheets

METHOD AND DEVICE FOR DIAGNOSING TROUBLE WITH SENSOR FUNCTION

TECHNICAL FIELD

The present invention relates to a fault diagnosis method and device of sensor function in an apparatus for output control with a 1-chip microcomputer into which an electric signal issued from a sensor for converting a physical quantity into an electric signal is fed.

BACKGROUND ART

A conventional example of fault diagnosis system of sensor function is explained by referring to FIG. 7. An output signal S1 from a drive circuit 1 is input into a sensor 2, and the sensor 2 is driven. The sensor 2 converts a physical quantity into an electric signal, and sends out a sensor output signal S2. The sensor output signal S2 is input into an interface circuit 3. The interface circuit 3 processes the sensor output signal S2 into a signal to be recognized by a 1-chip microcomputer 4, and issues an electric signal (digital signal) S3.

The 1-chip microcomputer 4 converts the electric signal S3 received from the interface circuit 3 into a control signal S4 having a specified function by a program stored in a memory 4A in advance, and issues to an output circuit 5. The output circuit 5 drives a load 6 depending on the drive signal S4.

The sensor output signal S2 usually settles within a certain output range of the sensor output. However, it a function trouble occurs in the sensor 2, and the sensor output signal S2 does not settle within the output range, the electric signal S3 from the interface circuit 3 goes out of the input range of the 1-chip microcomputer 4. Accordingly, the 1-chip microcomputer 4 issues a fail signal S5. When receiving the fail signal S5, the output circuit 5 lights up a fail lamp 7. As a result, if the sensor output signal S2 does not settle within the output range, such trouble of the sensor function can be detected.

However, in spite of the trouble in the sensor function, if the sensor output signal S2 settles within the output range, it is not known what signal is produced when the electric signal S3 is issued from the interface circuit 3, and it is hard to detect fault of the sensor function.

It is hence an object of the invention to present a method and device for fault diagnosis of sensor function capable of detecting trouble of sensor function even if a sensor output signal issued from a sensor settles within a certain output range.

DISCLOSURE OF INVENTION

In order to achieve the object, the invention is characterized in a fault diagnosis method of sensor function in an apparatus for controlling an output by using a 1-chip microcomputer which receives an electric signal from a sensor for converting a physical quantity into the electric signal, wherein a drive circuit for driving the sensor is driven by a drive signal issued from the 1-chip microcomputer.

The invention is also characterized in that a fault diagnosis device of sensor function in an output control apparatus including a sensor for converting a physical quantity into an electric signal and issuing, and a 1-chip microcomputer for controlling the output by receiving the electric signal, comprises a drive circuit for driving the sensor, as being controlled by a control signal issued from the 1-chip microcomputer, wherein the 1-chip microcomputer diagnoses the fault of sensor function by controlling an operation of the drive circuit.

According to the invention, it is possible to detect trouble of sensor function even if the sensor output range settles within an output range.

BEST MODE FOR EMBODYING THE INVENTION

Figure 1:
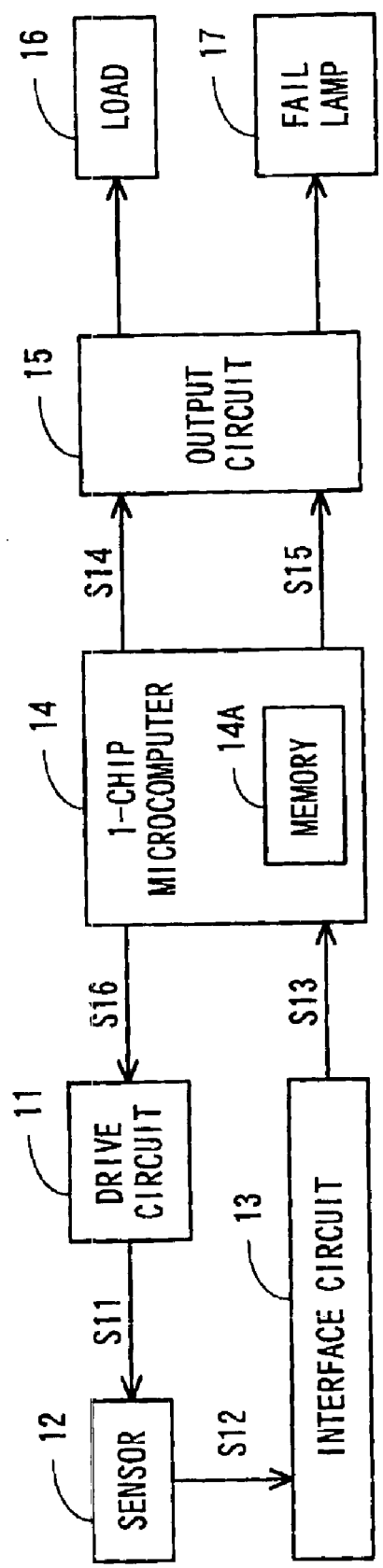
FIG. 1 is a block diagram showing a fault diagnosis system of sensor function in an embodiment of the invention.

Referring now to the drawings, the invention is specifically described below. FIG. 1 is a block diagram of a fault diagnosis system of sensor function in an embodiment of the invention.

In the drawing, a 1-chip microcomputer 14 issues a drive signal S16 (for example, a clock signal) according to a program stored in a memory 14A in advance, and the drive signal S16 is input into a drive circuit 11. An output signal S11 from the drive circuit 11 is input into a sensor 12, and the sensor 12 is driven. The sensor 12 converts the physical quantity into an electric signal, and issues a sensor output signal S12. The sensor output signal S12 is input into an interface circuit 13. The interface circuit 13 processes the sensor output signal 12 into a signal to be recognized in the 1-chip microcomputer 14, and an electric signal (digital signal) S13 is issued.

The 1-chip microcomputer 14 converts the electric signal S13 received from the interface circuit 13 into a control signal S14 having a specified function by the program stored in the memory 14A, and issues to an output circuit 15. The output circuit 15 drives a load 16 depending on the control signal S14.

When the 1-chip microcomputer 14 stops the drive circuit 11 by the drive signal S16, the sensor 12 issues a predetermined specific sensor output signal S12. The interface circuit 13, receiving the specific sensor output signal S12, issues a corresponding specific electric signal (digital signal) S13.

Suppose, in spite of trouble in the sensor 12, a sensor output signal S12 within a certain output range is being issued from the sensor 12. In this case, when the drive circuit 11 is stopped by stopping the drive signal S16 from the 1-chip microcomputer 14, the predetermined specific sensor output signal S12 is not issued from the sensor 12, and then the specific sensor output signal S13 is not issued from the interface circuit 13. As a result, the 1-chip microcomputer 14 judges that the sensor 12 is defective, and issues a fail signal S15 to the output circuit 15. Consequently, the output circuit 15 lights up a fail lamp 17.

Due to trouble in the sensor 12, meanwhile, if the sensor output signal S12 does not settle within the output range, the electric signal S13 from the interface circuit 13 goes out of the input range of the 1-chip microcomputer 14. Accordingly, the 1-chip microcomputer 14 issues a fail signal S15 to light up the tail lamp 17, thereby realizing fault diagnosis, which is same as in the prior art.

Figure 2:
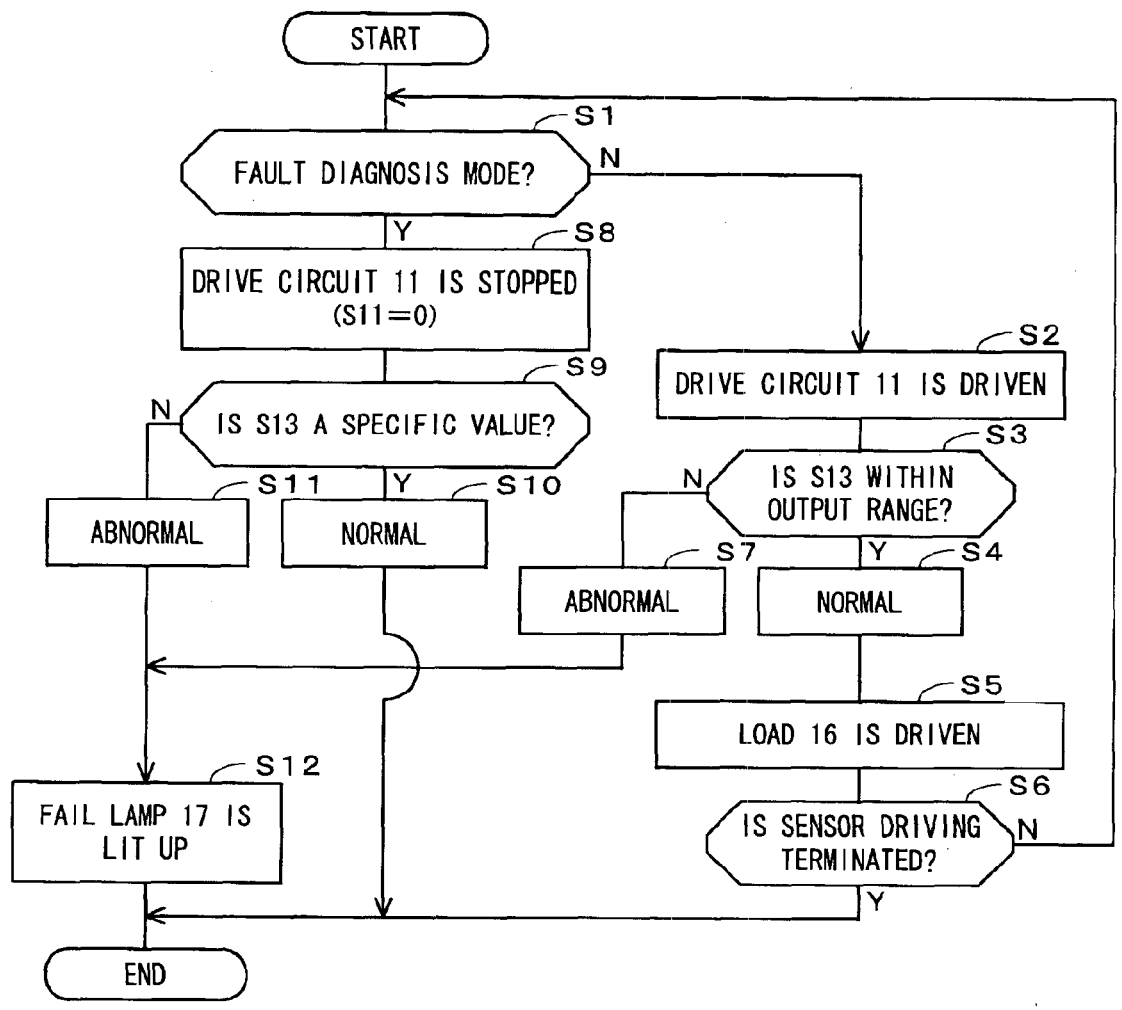
FIG. 2 is a flowchart showing an outline of operation of 1-chip microcomputer.

FIG. 2 is a flowchart explaining the operation of the 1-chip microcomputer 14. At step S1, fault diagnosis mode is judged, and if judged negatively (execution mode), going to step S2, the drive circuit 11 is driven. At step S3, the electric signal S13 from the interface circuit 13 is judged to be within specified output range or not. If judged affirmatively, going to step S4, the sensor 12 is judged to be normal. At step S5, the load 16 is driven, and at step S6, it is judged if the drive terminating command of the sensor 12 is received or not. If judged affirmatively, the operation is terminated, but if judged negatively, the process returns to step S1. Thus, in normal operation, steps S1 to S6 are repeated, but if judged negatively at step S3, the 1-chip microcomputer 14 judges that the sensor 12 has a function trouble, and goes to step S12 to light up the fail lamp 17.

If judged affirmatively at step S1 to get into fault diagnosis mode, going to step S8, the 1-chip microcomputer 14 stops the operation of the drive circuit 11. At step S9, it is judged if the electric signal S13 from the interface circuit 13 is a predetermined specific value or not, and if judged affirmatively, the process goes to step S10, and the sensor 12 is judged to be normal. If judged negatively at step S9, going to step S11, the sensor 12 is judged to be abnormal. The process goes to step S12 and the fail lamp 17 is lit up.

In this manner, the 1-chip microcomputer 14 detects failure of the sensor 12.

Figure 3:
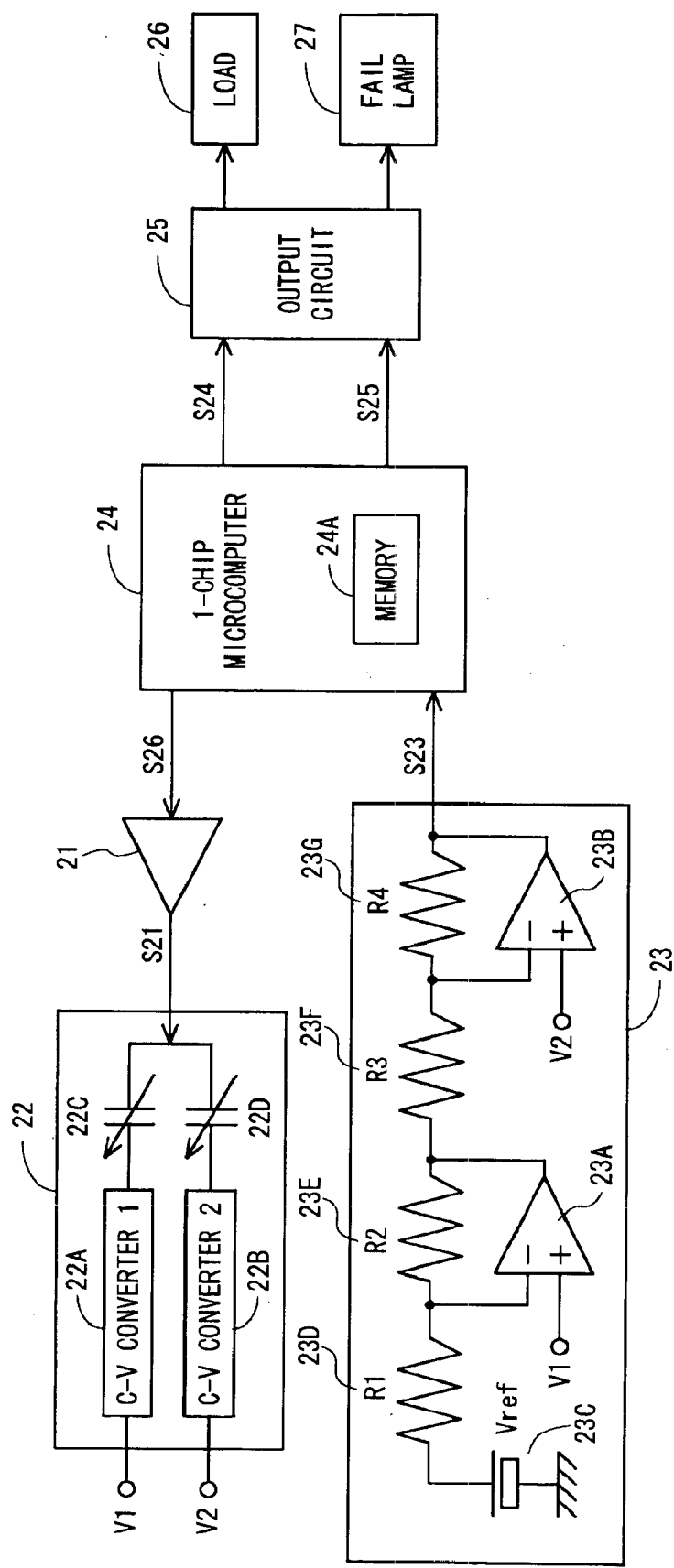
FIG. 3 is a block diagram showing a fault diagnosis system of a slant sensor in a specific example of the invention.

A specific example of the invention is described. FIG. 3 is a block diagram of a device for output control using a slant sensor for detecting the inclination of liquid level of dielectric solution as change in the electrostatic capacity, in which the inclination angle of the slant sensor controlled by the drive signal issued from a 1-chip microcomputer is converted into an electric signal, and this electric signal is input into the 1-chip microcomputer.

The 1-chip microcomputer 24 generates a clock signal S26 by a program stored in a memory 24A in advance, and supplies the clock signal S26 into a buffer circuit (for example, C-MOS inverter) 21 as a drive circuit. The buffer circuit 21 shapes the waveform of the clock signal S26, and corrects, for example, dullness of the waveform. The shaped clock signal S21 is supplied into a slant sensor 22.

The slant sensor 22 detects the inclination of the dielectric solution as a change in the electrostatic capacity. The slant sensor 22 is composed of electrostatic capacities 22C, 22D changing depending on the inclination, and C-V (capacity-voltage) converters 22A, 22B for converting the two electrostatic capacities into voltages, and output voltages V1, V2 are respectively produced from the C-V converters 22A, 22B. In this manner, the inclination angle is converted into (V2−V1). The principle and structure of the slant sensor 22 are known, and are explained only briefly herein.

Figure 4A:
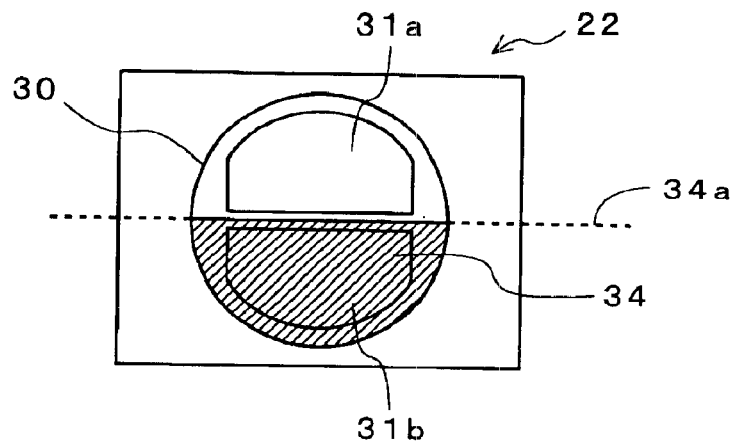
FIG. 4A to FIG. 4C are diagrams showing the relation between the electrode of the slant sensor and liquid level of dielectric solution.
Figure 4B:
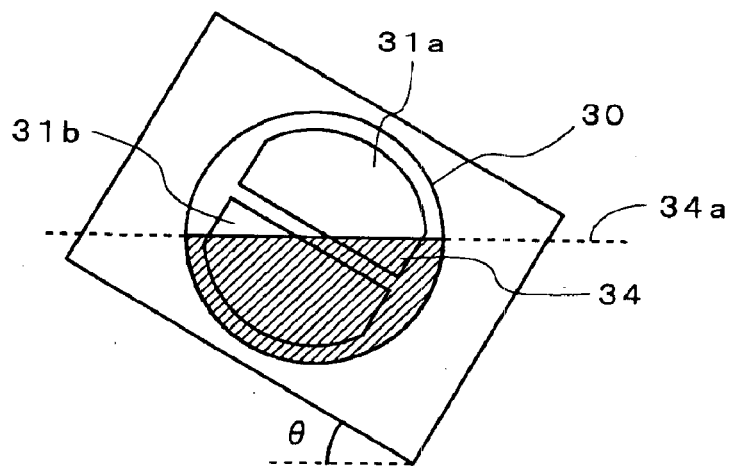
Figure 4C:
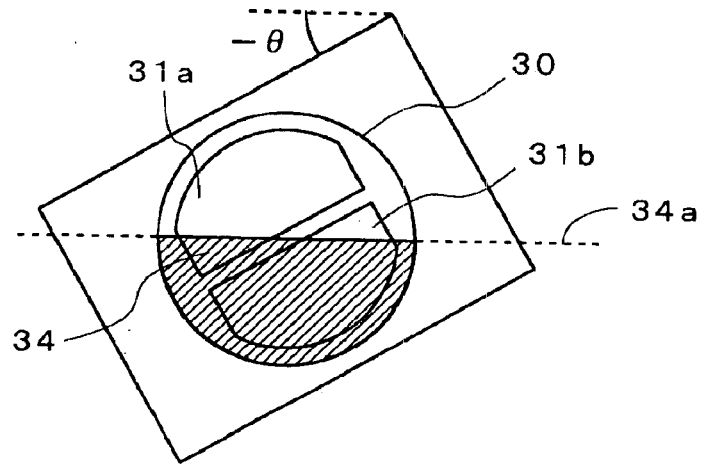

FIG. 4A, FIG. 4B, and FIG. 4C are schematic diagrams of the slant sensor 22 and inclination θ. The slant sensor 22 comprises a common electrode 30, semicircular first electrode 31a and second electrode 31b having the both ends cut off, and a dielectric solution 34 contained in the space formed by the common electrode 30 and first and second electrodes 31a, 31b. The common electrode 30 and first and second electrodes 31a, 31b are disposed parallel to each other at specific intervals.

At the inclination θ=0, as shown in FIG. 4A, the liquid level 34a of the dielectric solution 34 does not reach the first electrode 31a, while the second electrode 31b is completely immersed. Accordingly, the difference between the electrostatic capacity C1 of the first electrode 31a and the electrostatic capacity C2 of the second electrode 31b is the largest, and the absolute value of (V2−V1) is the maximum. Next, at θ>0 or θ<0, as shown in FIG. 4B and FIG. 4C, respectively, the absolute value of the difference of the electrostatic capacity C1 of the first electrode 31a and the electrostatic capacity C2 of the second electrode 31b decreases as the value of θ increases in the positive or negative direction.

On the other hand, as the inclination θ increases in the positive or negative direction, the absolute value of (V2−V1) decreases according to a quadratic function.

An amplifier circuit 23 as the interface circuit is composed of two operational amplifiers 23A, 23B, a reference voltage (Vref) 23C, and resistances 23D to 23G (R1 to R4), and output voltages V1, V2 of the slant sensor 22 are fed into the operational amplifiers 23A, 23B, respectively. The output signal S23 of the amplifier circuit 23 is expressed in the following formula (1).

$$S23=-[(R1+1)/R2]\times|V2-V1|+Vref \quad (1)$$

where R1=R2 and R2=R3.

Herein, the output signal S23 is adjusted and issued as a gain that can be recognized by the 1-chip microcomputer 24 according to the ratio of R1 and R2. For example, it is set in a voltage range of 1 V to 4 V. The absolute value of (V2−V1) changes according to a quadratic function.

The 1-chip microcomputer 24 recognizes the inclination angle by putting the output signal S23 in the program stored in the memory 24A in advance and issues an output signal S24 to the output circuit 25. The output circuit 25 drivers the load 26 depending on the output signal S24.

The output signal S23 is set so as to be issued within a certain voltage range (for example, 1 V to 4 V). If the slant sensor 22 issues abnormal voltages V1, V2 and the output voltage of the output signal S23 is out of the preset voltage range, the 1-chip microcomputer 24 judges that the slant sensor 22 is defective by the program stored in the memory 24A. As a result, a fail signal S25 is issued, and the fail lamp 27 is lit up through the output circuit 25.

While the slant sensor 22 is driven by the clock signal S21, when the clock signal S21 is stopped (fixed at H or L), the output voltage (V1−V2) of the slant sensor 22 becomes 0 V, and the output signal S23 becomes S23=Vref according to formula (1). That is, while the slant sensor 22 is normal, if the clock signal S21 is stopped, a specific voltage Vref is input into the 1-chip microcomputer 24.

In other words, if the voltage of the output signal S23 when the 1-chip microcomputer 24 stops the clock signal S26 is an expected value of Vref, the sensor function is normal, and if not expected value, that is, other voltage than Vref, the sensor function is abnormal, and trouble is judged.

The sensitivity of the slant sensor for detecting the inclination of the dielectric solution as the change in the electrostatic capacity depends on the clock frequency. Accordingly, in other method of fault diagnosis, by varying the frequency without stopping the clock, the sensitivity of the slant sensor is changed, and an expected value may be obtained.

Figure 5:
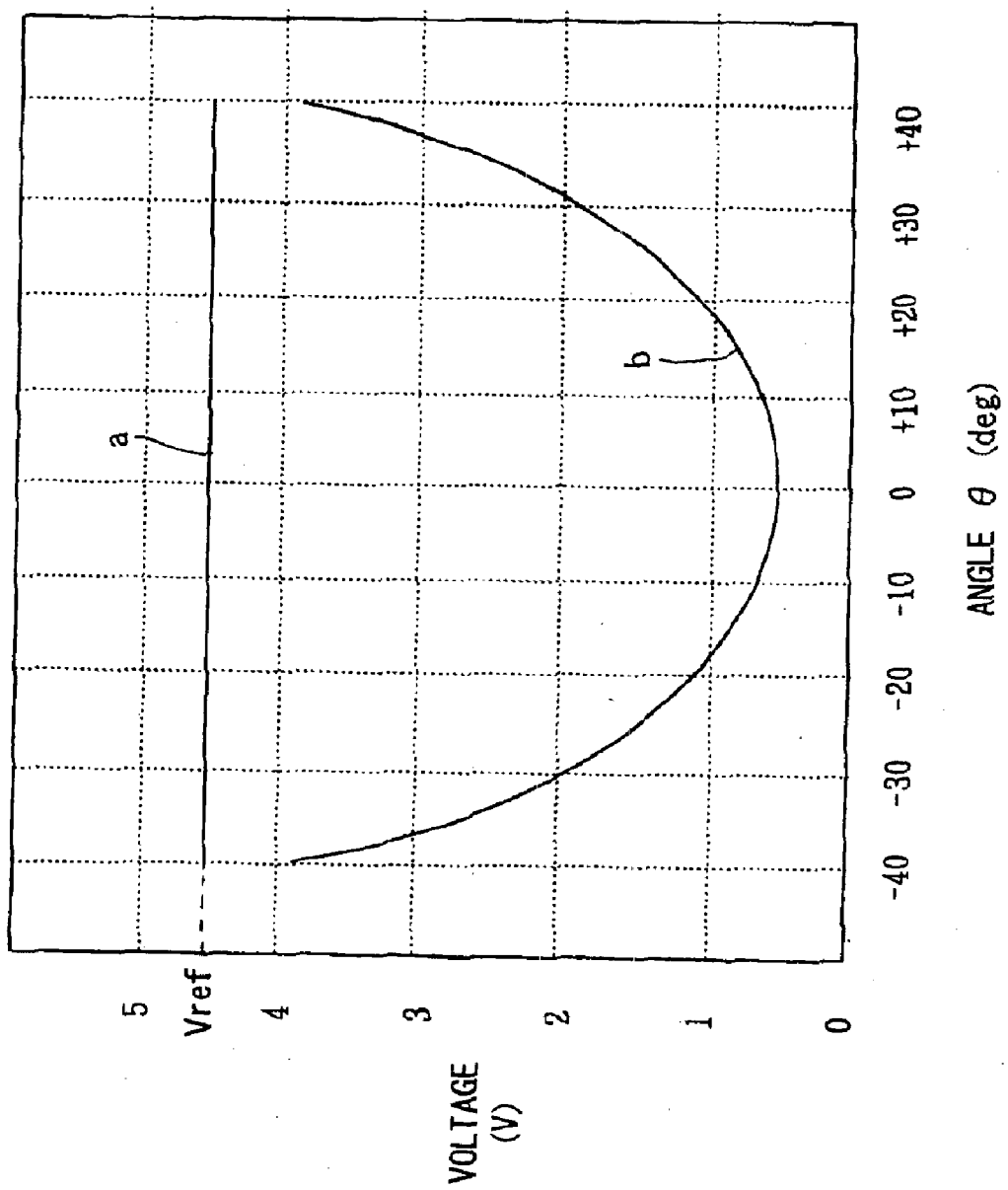
FIG. 5 is an output voltage characteristic diagram corresponding to the angle of the slant sensor in FIG. 3.

FIG. 5 is a diagram showing the output voltage corresponding to a typical angle when the output of the slant sensor for detecting the inclination of the dielectric solution as the change in the electrostatic capacity is amplified in a differential amplifier circuit. In the diagram, line (a) shows the characteristic when the 1-chip microcomputer 24 stops sending of clock signal S21 (fault diagnosis mode), and curve (b) shows the characteristic when the 1-chip microcomputer 24 is sending out the clock signal S21 (execution mode). As shown in the diagram, in the execution mode, if the inclination angle θ=0, the output voltage is the lowest, and as the inclination angle θ increases in the positive or negative direction, it increases according to a quadratic function.

Figure 6:
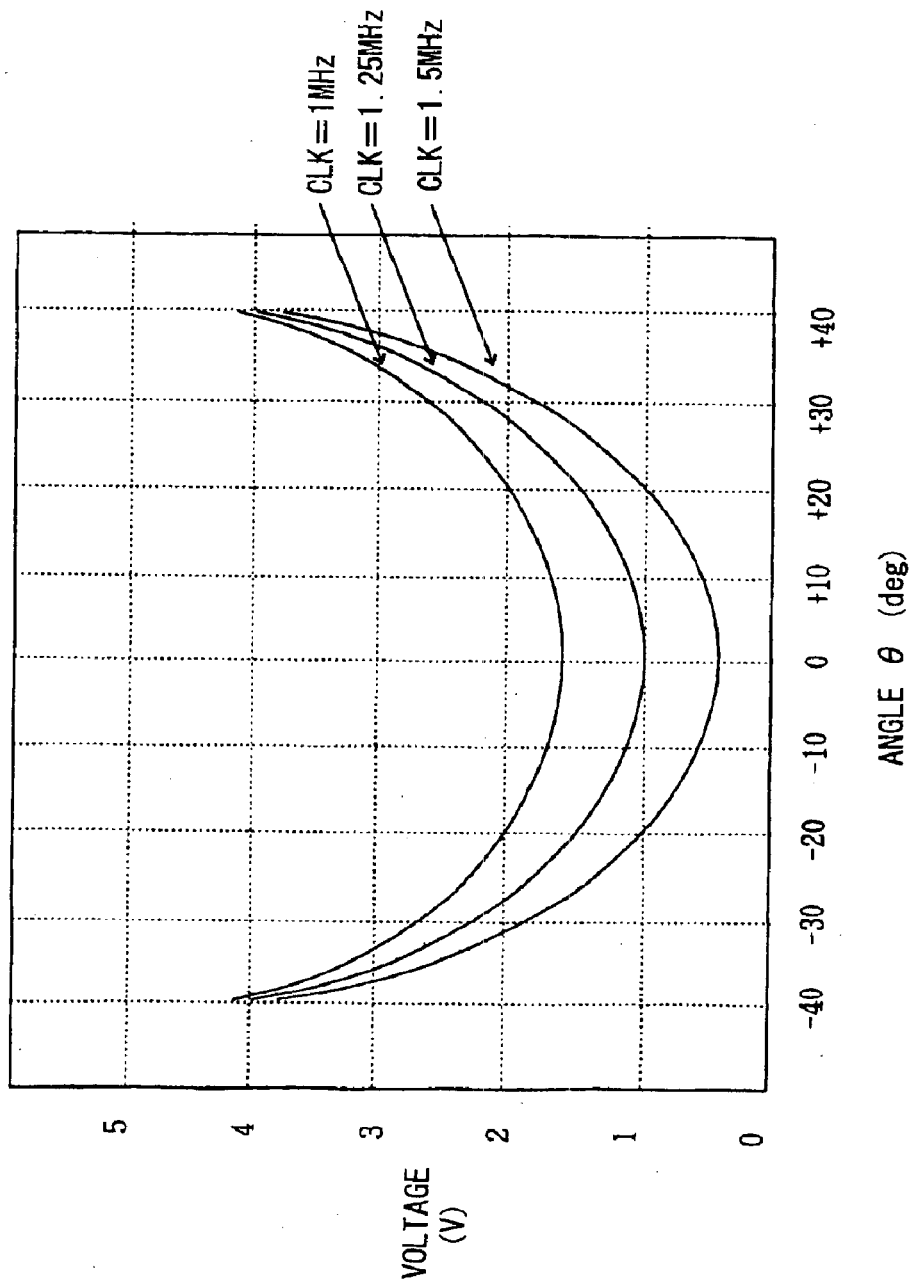
FIG. 6 is an output voltage characteristic diagram corresponding to the angle of the slant sensor in FIG. 3, showing the frequency dependence.
Figure 7:
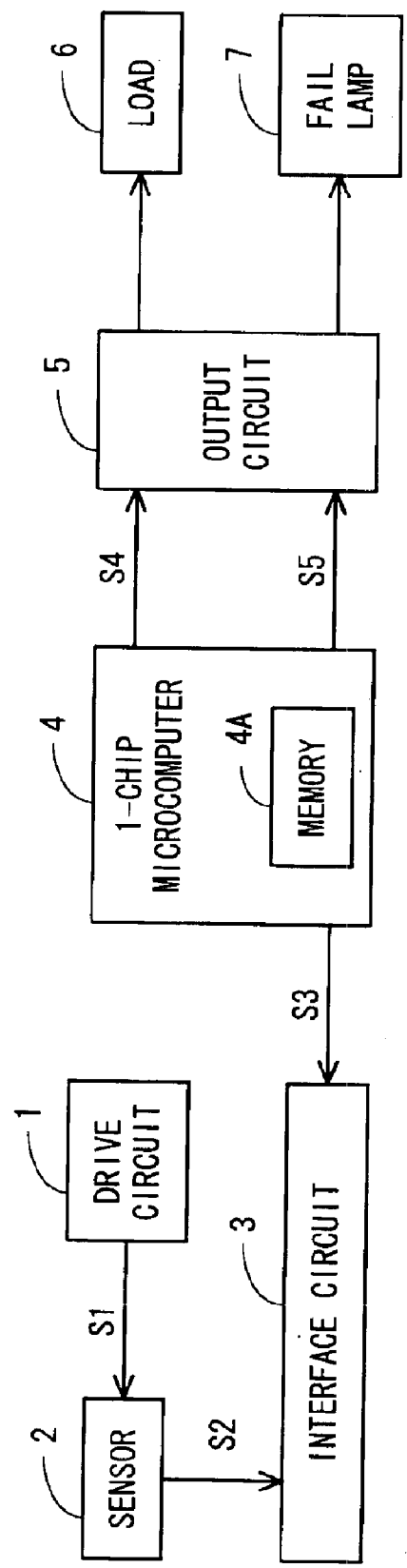
FIG. 7 is a block diagram showing a fault diagnosis system of sensor function in a prior art.

FIG. 6 is a diagram showing the frequency dependence when the output of the slant sensor for detecting the inclination of the dielectric solution as the change in the electrostatic capacity is amplified in a differential amplifier circuit. As shown in the diagram, as the clock frequency becomes lower, the characteristic of the output voltage is shifted upward.

Industrial Applicability

As described herein, according to the invention, the sensor function can be checked by the program stored in the 1-chip microcomputer in advance, and early fault diagnosis of sensor function and fault notice to outside are realized, and malfunction is prevented and safety is enhanced.

The invention is not limited to the illustrated embodiment alone, but may be changed and modified in various forms according to the principle of the invention, and hence these changes and modifications are also included in the scope of the invention.

According to the invention, since the sensor function can be checked by the program stored in the 1-chip microcomputer in advance, early fault diagnosis of sensor function and fault notice to outside are realized.

What is claimed is:

1. A fault diagnosis method for diagnosing a sensor function in an apparatus for controlling an output by using a 1-chip microcomputer which receives an electric signal from a sensor for converting a physical quantity into the electric signal, comprising the steps of:

driving a drive circuit for driving the sensor with a drive signal issued from the 1-chip microcomputer;

said 1-chip microcomputer receiving an electric signal on the basis of the sensor during normal operation by issuing the drive signal, and receiving an electric signal on the basis of the sensor at a predetermined specific value during stopping of the drive signal; and diagnosing a fault of the sensor function when the electric signal of the predetermined specific value is not received during stopping of the drive signal, thereby detecting a fault of a sensor function even if the sensor output settles within an output range of the sensor.

2. The fault diagnosis method for diagnosing a sensor function of claim 1, wherein said 1-chip microcomputer has a program stored in advance, and executes fault diagnosis of the sensor function.

3. A fault diagnosis method for diagnosing a fault of a sensor function in an apparatus for controlling an output by using a 1-chip microcomputer, comprising the steps of:

receiving an electric signal from a sensor for converting a physical quantity into the electric signal;

driving a drive circuit for driving the sensor with a drive signal issued from the 1-chip microcomputer;

said 1-chip microcomputer receiving the electric signal on the basis of the sensor during normal operation by issuing the drive signal, and receiving the electric signal with an expected characteristic from the sensor by varying a frequency of the drive signal; and diagnosing the fault of the sensor function when the electric signal with the expected characteristic is not received during varying of the frequency of the drive signal, thereby detecting a fault of a sensor function even if the sensor output settles within an output range of the sensor.

4. The fault diagnosis method for diagnosing a fault of a sensor function of claim 3, wherein said 1-chip microcomputer has a program stored in advance, and executes fault diagnosis of the sensor function.

5. A fault diagnosis device for diagnosing a fault of a sensor function in an output control apparatus, comprising:

a sensor for converting a physical quantity into an electric signal;

a 1-chip microcomputer for controlling an output upon receiving the electric signal; and a drive circuit controlled by a control signal issued from the 1-chip microcomputer to drive the sensor, wherein said 1-chip microcomputer stops driving of the drive circuit and detects whether the sensor is outputting a specific value as a basis to diagnose the fault of the sensor function, thereby detecting a fault of a sensor function even if the sensor output settles within an output range of the sensor.

6. The fault diagnosis device for diagnosing a fault of a sensor function of claim 5, wherein the drive circuit comprises a buffer circuit for shaping a waveform of the signal from the 1-chip microcomputer.

7. The fault diagnosis device for diagnosing a fault of a sensor function of claim 5, further comprising:

an interface circuit for amplifying the signal from the sensor and then sending it to the 1-chip microcomputer.

8. A fault diagnosis device for diagnosing a fault of a sensor function in an output control apparatus, comprising:

a sensor for converting a physical quantity into an electric signal;

a 1-chip microcomputer for controlling an output by receiving the electric signal; and a drive circuit for driving the sensor being controlled by a control signal issued from the 1-chip microcomputer, wherein said 1-chip microcomputer changes a frequency of the drive signal supplied to the drive circuit and detects whether the sensor output is the electric signal with an expected characteristic, thereby diagnosing the fault of the sensor function, thereby detecting a fault of a sensor function even if the sensor output settles within an output range of the sensor.

9. The fault diagnosis device for diagnosing a fault of a sensor function of claim 8, wherein the drive circuit comprises a buffer circuit for shaping a waveform of the signal from the 1-chip microcomputer.

10. The fault diagnosis device for diagnosing a fault of a sensor function of claim 8, further composing:

an interface circuit for amplifying the signal from the sensor and then sending it to the 1-chip microcomputer.

* * * * *